(12) United States Patent
Laster

(10) Patent No.: US 11,143,758 B2
(45) Date of Patent: Oct. 12, 2021

(54) SONAR TRANSDUCER PERFORMANCE OPTIMIZATION

(71) Applicant: NAVICO HOLDING AS, Egersund (NO)

(72) Inventor: Matthew W. Laster, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 753 days.

(21) Appl. No.: 15/783,491

(22) Filed: Oct. 13, 2017

(65) Prior Publication Data
US 2019/0113619 A1    Apr. 18, 2019

(51) Int. Cl.
*G01S 15/89*    (2006.01)
*G01S 15/87*    (2006.01)
(Continued)

(52) U.S. Cl.
CPC .......... *G01S 15/8902* (2013.01); *G01S 7/521* (2013.01); *G01S 7/52003* (2013.01); *G01S 7/524* (2013.01);
(Continued)

(58) Field of Classification Search
CPC .......... G01S 15/89; G01S 7/521; G01S 15/87; G01S 15/8918; G01S 15/8902; G01S 15/8995; G01S 15/8993; G10K 11/008
See application file for complete search history.

(56) References Cited

U.S. PATENT DOCUMENTS 3,740,707 A * 6/1973 O'Brien ................ G01S 7/4017
                                                                367/155
4,244,026 A   1/1981 Dickey, Jr.
(Continued)

FOREIGN PATENT DOCUMENTS

WO   WO 2007/025572 A1   3/2007
WO   WO 2008/105932 A2   9/2008
WO   WO 2010/100868 A1   9/2010

OTHER PUBLICATIONS

Simrad Introduces Forwardscan® [online] [retrueved Nov. 25, 2014]. Retrieved from the Internet: <URL: http://www.simrad-yachting.com/en-US/Pressreleases/2014/Simrad-Introduces-Forwardscan/>, (dated Feb. 25, 2014), 2 pages.
(Continued)

*Primary Examiner* — Isam A Alsomiri
*Assistant Examiner* — Amie M Ndure
(74) *Attorney, Agent, or Firm* — Nelson Mullins Riley & Scarborough LLP

(57) ABSTRACT

A marine electronic device is provided including a user interface comprising a display, a marine electronic device processor, and a memory. The memory includes computer program code configured to cause the marine electronic device to receive sonar return data from at least one transducer element configured to transmit sound waves into a body of water, receive the sonar return signals from the body of water, and convert the sonar return signals into sonar return data. The computer program code is further configured to cause the marine electronic device to generate one or more sonar images based on the sonar return data, identify one or more degraded performance characteristics associated with the sonar return data or the one or more sonar images, and cause an alert based on identification of the one or more degraded performance characteristics.

18 Claims, 11 Drawing Sheets

(51) Int. Cl.
| | | |
|---|---|---|
| G01S 7/521 | (2006.01) | |
| G01S 15/96 | (2006.01) | |
| G01S 7/526 | (2006.01) | |
| G01S 7/524 | (2006.01) | |
| G01S 7/62 | (2006.01) | |
| G01S 7/52 | (2006.01) | |

(52) U.S. Cl.
CPC ............ *G01S 7/526* (2013.01); *G01S 7/6272* (2013.01); *G01S 7/6281* (2013.01); *G01S 15/876* (2013.01); *G01S 15/96* (2013.01); *G01S 7/6245* (2013.01)

(56) References Cited

U.S. PATENT DOCUMENTS

| | | | |
|---|---|---|---|
| 4,879,697 | A | 11/1989 | Lowrance et al. |
| 4,939,700 | A | 7/1990 | Breton |
| 5,025,423 | A | 6/1991 | Earp |
| 5,103,129 | A | 4/1992 | Slayton et al. |
| 5,184,330 | A | 2/1993 | Adams et al. |
| 5,200,931 | A | 4/1993 | Kosalos et al. |
| 5,530,680 | A | 6/1996 | Whitehurst |
| 5,537,380 | A | 7/1996 | Sprankle, Jr. et al. |
| 6,130,641 | A | 10/2000 | Kraeutner et al. |
| 6,201,767 | B1 | 3/2001 | Lagrace et al. |
| 7,606,114 | B2 | 10/2009 | Bachelor et al. |
| 7,755,974 | B2 | 7/2010 | Betts et al. |
| 8,254,208 | B2* | 8/2012 | Vogt ........................ G01C 13/00 367/88 |
| 8,300,499 | B2 | 10/2012 | Coleman et al. |
| 8,305,840 | B2 | 11/2012 | Maguire |
| 8,470,605 | B2* | 6/2013 | Putnam ............. B01L 3/502761 235/454 |
| 8,717,847 | B2 | 5/2014 | Blake |
| 8,767,509 | B2 | 7/2014 | Freking et al. |
| 9,335,412 | B2 | 5/2016 | Proctor |
| 9,495,764 | B1 | 11/2016 | Boardman et al. |
| 9,720,084 | B2 | 8/2017 | Horner et al. |
| 9,739,884 | B2 | 8/2017 | Proctor et al. |
| 9,784,832 | B2 | 10/2017 | Proctor et al. |
| 2002/0071345 | A1 | 6/2002 | Chiang et al. |
| 2002/0167862 | A1 | 11/2002 | Tomasi et al. |
| 2002/0176457 | A1* | 11/2002 | DeCusatis ............. H04B 10/572 372/26 |
| 2002/0188200 | A1 | 12/2002 | Mauchamp et al. |
| 2003/0057936 | A1* | 3/2003 | Prockup .................. G01R 31/12 324/76.53 |
| 2003/0060094 | A1* | 3/2003 | Motsenbocker ......... B63H 1/28 440/6 |
| 2003/0061008 | A1* | 3/2003 | Smith, Jr. ........... G05B 23/0283 702/188 |
| 2003/0081503 | A1 | 5/2003 | Barnard et al. |
| 2003/0127609 | A1* | 7/2003 | El-Hage ............. G01N 21/6452 250/574 |
| 2003/0158545 | A1* | 8/2003 | Hovda ................ A61B 18/1402 606/32 |
| 2003/0235112 | A1* | 12/2003 | Zimmerman ........... G01S 15/89 367/4 |
| 2004/0090195 | A1* | 5/2004 | Motsenbocker ....... B63H 20/36 318/109 |
| 2005/0007880 | A1 | 1/2005 | Zimmerman et al. |
| 2005/0036404 | A1 | 2/2005 | Zhu et al. |
| 2005/0099887 | A1 | 5/2005 | Zimmerman et al. |
| 2005/0101867 | A1 | 5/2005 | Johnson et al. |
| 2005/0104685 | A1* | 5/2005 | Kuroki ................... H03H 9/725 333/133 |
| 2006/0013066 | A1 | 1/2006 | Nishimori et al. |
| 2006/0042389 | A1* | 3/2006 | Sato ........................ A61B 8/145 73/603 |
| 2006/0063271 | A1* | 3/2006 | Putnam ............. G01N 35/00732 436/174 |
| 2006/0189974 | A1* | 8/2006 | Penny .................. A61B 18/042 606/34 |
| 2007/0025183 | A1 | 2/2007 | Zimmerman et al. |
| 2007/0044559 | A1 | 3/2007 | Andrews |
| 2008/0080313 | A1* | 4/2008 | Brumley ................. G01S 15/58 367/89 |
| 2008/0239870 | A1 | 10/2008 | Dubuis et al. |
| 2008/0319375 | A1* | 12/2008 | Hardy .................. A61K 9/1075 604/22 |
| 2009/0059723 | A1* | 3/2009 | Scoca ..................... G01S 15/60 367/89 |
| 2010/0080082 | A1 | 4/2010 | Betts et al. |
| 2011/0013484 | A1 | 1/2011 | Coleman et al. |
| 2011/0013485 | A1 | 1/2011 | Maguire |
| 2011/0118998 | A1* | 5/2011 | Loose ................... F04D 29/669 702/54 |
| 2011/0189440 | A1* | 8/2011 | Appleby ................ B29C 33/301 428/156 |
| 2011/0283592 | A1* | 11/2011 | Smith ..................... A01K 79/02 43/4.5 |
| 2012/0106299 | A1 | 5/2012 | Rowe et al. |
| 2012/0163126 | A1 | 6/2012 | Campbell et al. |
| 2012/0281507 | A1 | 11/2012 | Rikoski |
| 2013/0148471 | A1 | 6/2013 | Brown et al. |
| 2013/0208568 | A1* | 8/2013 | Coleman ............... G01S 15/003 367/88 |
| 2014/0010048 | A1 | 1/2014 | Proctor |
| 2014/0010049 | A1 | 1/2014 | Proctor |
| 2014/0113828 | A1* | 4/2014 | Gilbert ..................... H01B 1/00 505/100 |
| 2014/0247152 | A1* | 9/2014 | Proud ................ A61B 5/02055 340/870.07 |
| 2014/0249825 | A1* | 9/2014 | Proud ..................... H02J 7/025 704/275 |
| 2014/0269163 | A1 | 9/2014 | Proctor |
| 2014/0269192 | A1 | 9/2014 | Proctor |
| 2015/0097838 | A1 | 4/2015 | Steward et al. |
| 2015/0180538 | A1* | 6/2015 | Smith ..................... H04Q 9/00 375/257 |
| 2015/0358026 | A1* | 12/2015 | Gan ......................... H03L 7/26 331/94.1 |
| 2015/0369908 | A1 | 12/2015 | Zimmerman et al. |
| 2016/0077199 | A1 | 3/2016 | Nickel et al. |
| 2016/0161233 | A1* | 6/2016 | Creedican ........... F41H 13/0081 102/205 |
| 2016/0232884 | A1 | 8/2016 | Parks |
| 2016/0259049 | A1 | 9/2016 | Proctor et al. |
| 2016/0259050 | A1 | 9/2016 | Proctor et al. |
| 2016/0259051 | A1 | 9/2016 | Proctor et al. |
| 2016/0259052 | A1 | 9/2016 | Kirmani |
| 2016/0259053 | A1 | 9/2016 | Proctor et al. |
| 2016/0341827 | A1 | 11/2016 | Horner et al. |
| 2016/0377716 | A1 | 12/2016 | Proctor et al. |
| 2017/0082739 | A1 | 3/2017 | Horner et al. |
| 2017/0219703 | A1 | 8/2017 | Proctor et al. |
| 2017/0227639 | A1* | 8/2017 | Stokes ................. G01S 7/6272 |
| 2017/0285167 | A1 | 10/2017 | Proctor et al. |
| 2020/0089214 | A1* | 3/2020 | Celia .................. G05B 19/4185 |
| 2020/0089215 | A1* | 3/2020 | Celia .................. G05B 23/0294 |
| 2020/0089216 | A1* | 3/2020 | Celia .................. G05B 23/0229 |

OTHER PUBLICATIONS

*ITC Application Equations for Underwater Sound Transducers*, International Transducer Corporation (1995) Rev. 8/00, 3 pages.

Giardina; *Interferometric Synthetic Aperture Sonar Signal Processing for Autonomous Underwater Vehicles Operating Shallow Water*; University of New Orleans Theses and Dissertations; Dec. 15, 2012; Retrieved from the Internet: URL:http://scholarworks.uno.edu/cgi/viewcontent.cgi?article=2587&context=td (retrieved on Jul. 7, 2016).

Griffiths, et al.; *Interferometric Synthetic Aperture Sonar for High-Resolution 3-D Mapping of the Seabed*; IEE Proceedings—Radar, Sonar and Navigation; vol. 144, No. 2; Apr. 1997; pp. 96-103.

Hansen, et al.; *Signal Processing for AUV Based Interferometric Synthetic Aperture Sonar*; Oceans 2003, MTS/IEEE Proceedings Celebrating the Past, Teaming Toward the Future; San Diego, CA; Sep. 22-26, 2003; Oceans MTS/IEEE Conference Proceedings, Columbia, MD; Marine Techn. Soc., Sep. 22, 2003; pp. 2438-2444.

(56) References Cited

OTHER PUBLICATIONS

Sintes, et al.; *Interferometric Side Scan Sonar: A Tool for High Resolution Sea Floor Exploration*; Technical Lessons Learnt from the Erika Incident and Other Oil Spills, Brest, Mar. 13-16, 2002; pp. 1-15.
Synnevag et al., "*A low complexity data-dependent beamformer*", Ultrasonics Symposium 2008, Nov. 2, 2008, pp. 1084-1087.
Synnevag et al., "A low complexity data-dependent beamformer", IEEE Transactions on Ultrasonics Ferroelectrics and Frequency Control, vol. 58, No. 2, Feb. 1, 2011, pp. 281-289.
Blomberg et al., "Improving Sonar Performance in Shallow Water Using Adaptive Beamforming", IEEE Journal of Oceanic Engineering, vol. 38, No. 2, Apr. 1, 2013, pp. 297-307.
Kraeutner et al.; *Rethinking Forward-Looking Sonar for AUV'S: Combining Horizontal Beamforming with Vertical Angle-of-Arrival Estimation*; Teledyne RD Instruments; Sep. 4, 2008.
Llort-Pujol et al.; *Advanced interferometric techniques for high-resolution bathymetly*; Journal of Marine Technology Society; Mar. 1, 2012; vol. 46, No. 2; pp. 1-27.
Sărăcin et al.; "*Interferometric Bathymetry—principles and utility*"; Oct. 8, 2013; $1^{st}$ European Conference of Geodesy and Geomatics Engineering; pp. 198-205.
IEEE Xplore Abstract—A low-complexity data-dependent beamformer [online] [retrieved Nov. 12, 2015]. Retrieved from the Internet: <URL: http://ieeexplore.ieee.org/xpl/freeabs_all.jsp?arnumber=5716445&abstractAccess-no&us . . . < (Feb. 2011) 2 pages.
IEEE Xplore Abstract—Improving Sonar Performance in Shallow Water Using Adaptive . . . [online] [retrieved Nov. 12, 2015]. Retrieved from the Internet: <URL: http://ieeexplore.ieee.org/xpl/articleDetailsjsp?reload=true&arnumber=640 1207>. (Apr. 2013) 2 pages.
Llort-Pujol et al.; *A New Approach for Fast and High-Resolution Interfometric Bathymetry*; IEEE Oceanic Engineering Society Newsletter, Summer 2006, pp. 12-19.
Koyama et al.; *Bathymetry by New Designed Interferometry Sonar Mounted on AUV*; MTTS/IEEE Techno-Ocean 2004; pp. 1169-1174.

\* cited by examiner

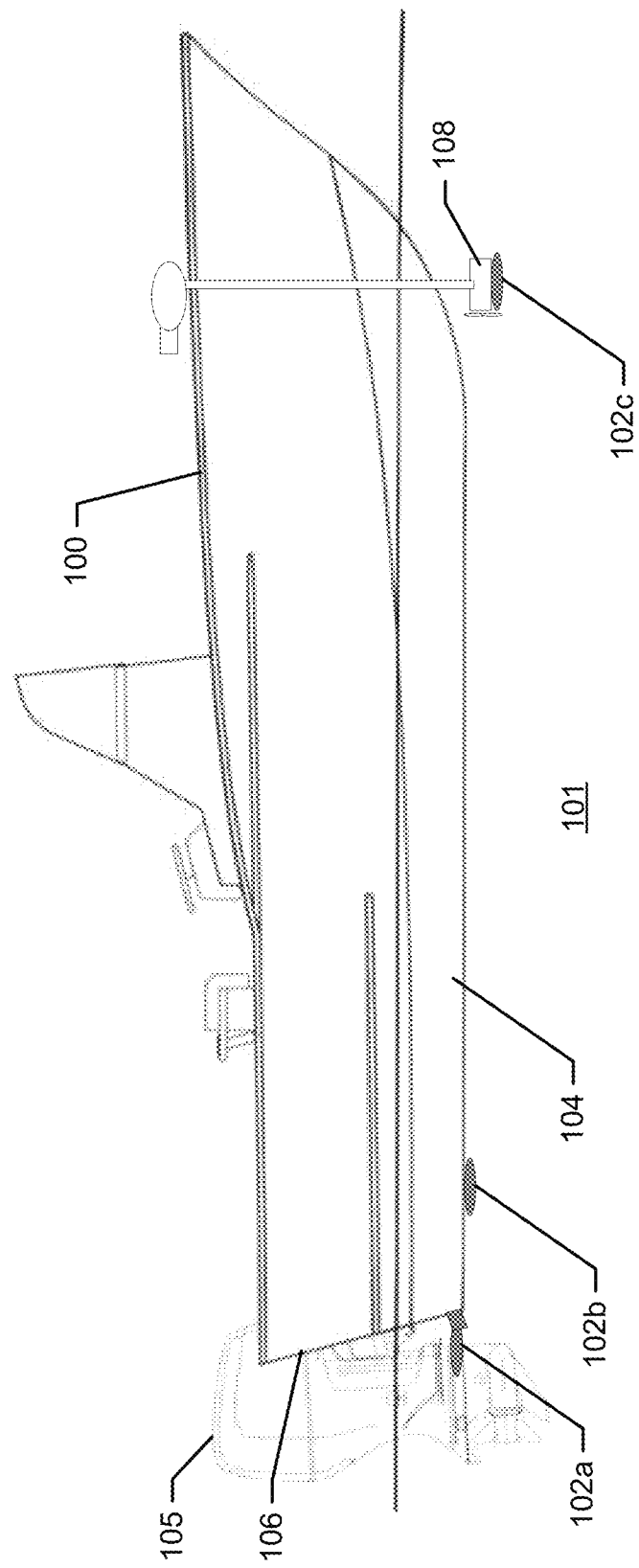

SONAR TRANSDUCER PERFORMANCE OPTIMIZATION

FIELD OF THE INVENTION

Embodiments of the present invention relate generally to sonar transducer operation, and more particularly, to systems and apparatuses for performance optimization of a sonar transducer.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, convert electrical energy into sound or vibrations at a particular frequency. A sonar sound beam is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed a display device, giving the user a "picture" of the underwater environment.

Installation of a sonar transducer assembly to a watercraft is generally performed out of the water by a user or a technician. The user may then enter the watercraft, e.g. vessel, into a body or water for operation, which may include operation of the sonar transducer. In some instances, the sonar image displayed on a display, such as of a multi-function display or marine electronic device, may be degraded due to improper installation, transducer assembly damage or degradation, or interference. Typically, the user contacts a technician or a support service to identify the source of the degraded sonar image and then adjustments or repairs may be performed by either the user or a technician. The identification of the cause of the degraded sonar image and adjustments or repairs may require time and attention detracting from the recreational or commercial activities of the vessel.

BRIEF SUMMARY OF THE INVENTION

Diagnosing and troubleshooting transducer assembly performance issues may take time away from recreational or commercial activities of the vessel, and, in many cases, may be beyond the skill level of the average user. In some cases, a user may spend significant time communicating with a support service to attempt to describe the performance issue and/or trying to adjust the sonar transducer assembly to correct the deficiency. The degradation may be difficult to describe to the support service or may not be obvious to the user. As a result, a user may become frustrated and may never address a correctable issue.

In an example embodiment, a marine electronic device, e.g. a multi-function display (MFD), is configured to automatically identify one or more degraded performance characteristics and alert the user accordingly. The marine electronic device may be configured to determine many different sonar performance issues, such as, without limitation, interference from a proximate sonar source, reflections from the vessel, the transducer coming out of the water at speed, damage to the transducer assembly, degradation of the transducer assembly, etc. In some example embodiments, the marine electronic device may identify one or more corrective actions for the user to perform to address the degraded performance issue. Additionally or alternatively, the marine electronic device may automatically adjust one or more operating parameters associated with the transducer assembly to address the degraded performance issue.

In some example embodiments, the marine electronic device may transmit an indication of the degraded performance issue and information identifying the device/user to a support server. A support service may utilize the data to diagnose the degraded performance issue and provide further instructions to the user to correct the deficiency.

In an example embodiment, a marine electronic device is provided including a user interface including a display, a marine electronic device processor, and a memory including computer program code. The computer program code is configured to, with the marine electronic device processor, cause the marine electronic device to receive sonar return data from at least one transducer element, which is configured to transmit sound waves into a body of water, receive the sonar return signals from the body of water, and convert the sonar return signals into sonar return data. The processor and memory are further configured to cause the marine electronic device to generate one or more sonar images based on the sonar return data, identify one or more degraded performance characteristics associated with the sonar return data or the one or more sonar images, and cause an alert based on identification of the one or more degraded performance characteristics.

In some example embodiments, the processor and memory are further configured to cause the marine electronic device to cause, in response to identifying one or more degraded performance characteristics, an adjustment of an operating parameter associated with the at least one transducer element. In an example embodiment, the adjustment of the operating parameter includes changing an operating frequency of at least one of the at least one transducer element.

In some example embodiments, the processor and memory are further configured to cause the marine electronic device to cause an indication of a corrective action for correction of the identified one or more degraded performance characteristics to be displayed on the user interface.

In an example embodiment, identifying the one or more degraded performance characteristics includes identifying one or more degraded performance elements in the one or more sonar images by applying object recognition to image data associated with the one or more sonar images.

In some example embodiments, identifying the one or more degraded performance characteristics includes analyzing the sonar return data. In an example embodiment, analyzing the sonar return data includes comparing the sonar return data to one or more interference thresholds.

In some example embodiments, the processor and memory are further configured to cause the marine electronic device to measure an impedance across the at least one transducer element, compare the measured impedance to a reference impedance value, and determine a degraded transducer condition based on the comparison of the measured impedance to the reference impedance value. The processor and memory are further configured to cause the marine electronic device to cause the alert further based on determining the degraded transducer condition.

In an example embodiment, the one or more degraded performance characteristics are caused by interference from a proximate sonar source.

In some example embodiments, the one or more degraded performance characteristics are caused by a reflection from a component of a watercraft to which the at least one transducer element is mounted.

In an example embodiment, the one or more degraded performance characteristics are caused by air covering at least a portion of the at least one transducer element.

In some example embodiments, the processor and memory are further configured to cause the marine electronic device to cause an indication of the one or more degraded performance characteristics to be transmitted to a remote server. In an example embodiment, the processor and memory are further configured to cause the marine electronic device to cause a user identifier to be transmitted in association with the indication of the one or more degraded performance characteristics.

Various example embodiments of the present invention include example marine electronic devices, computer program products, systems, and methods further described herein.

BRIEF DESCRIPTION OF THE DRAWINGS

Figure 2A:
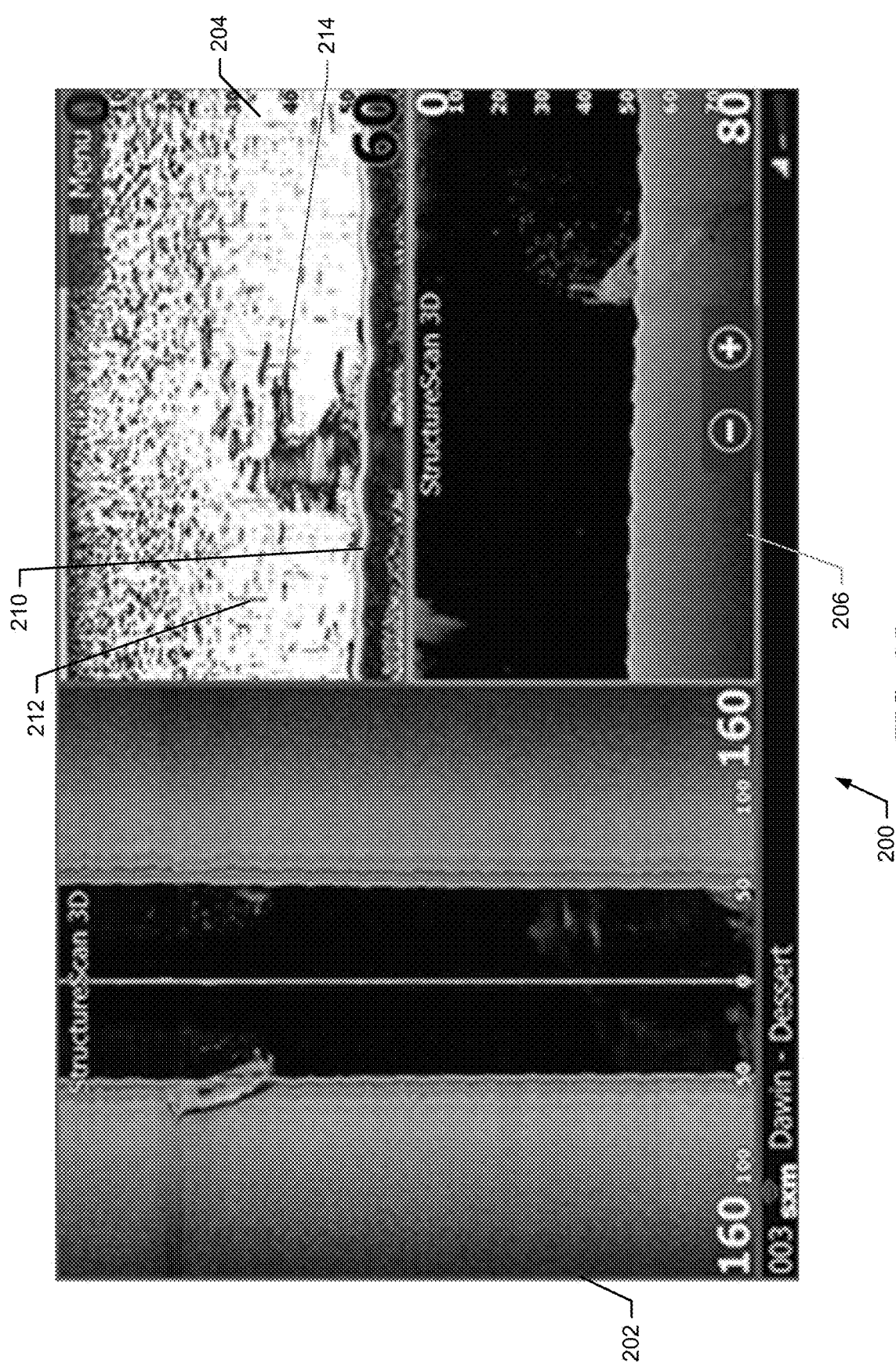
Figure 2B:
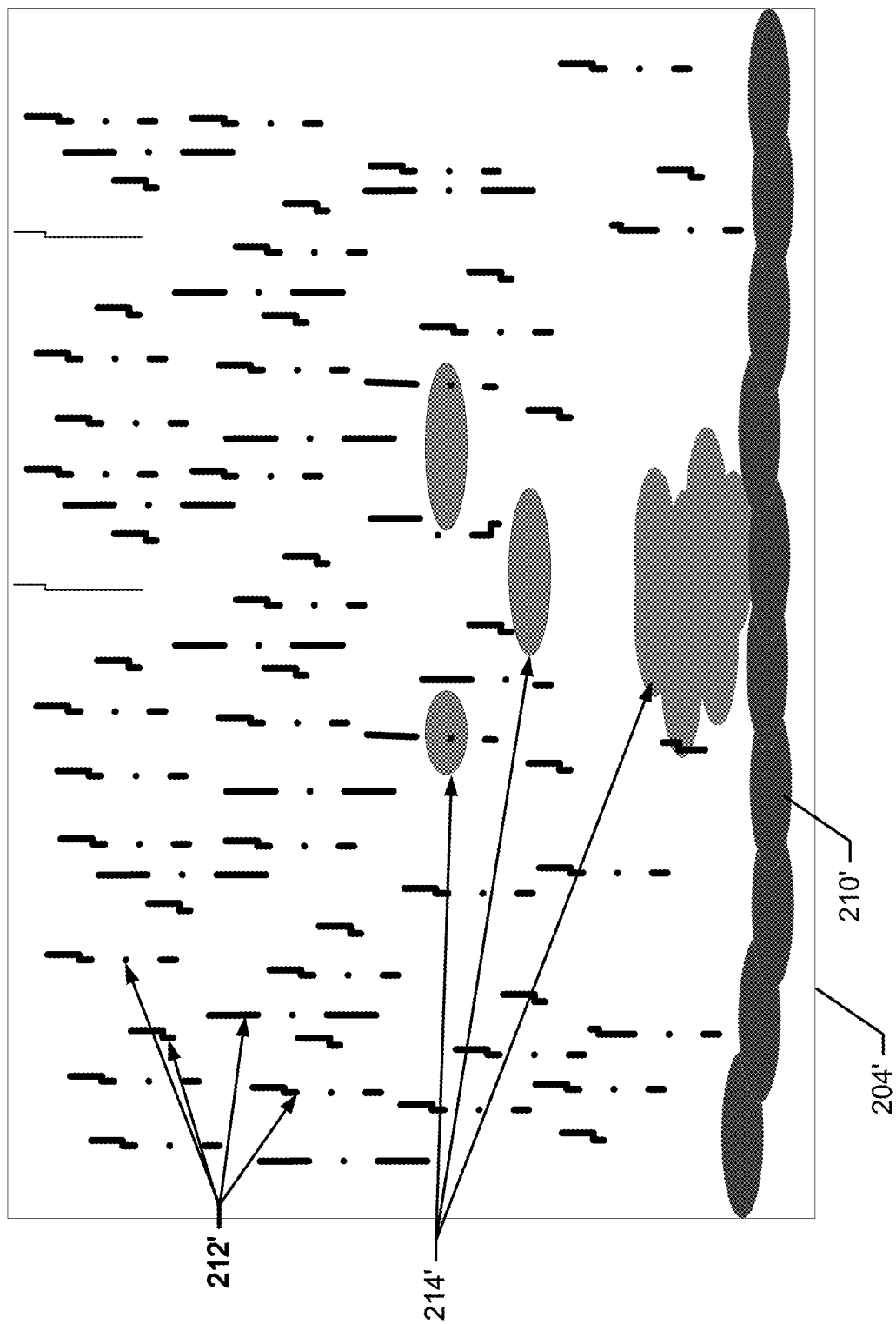
Figure 3A:
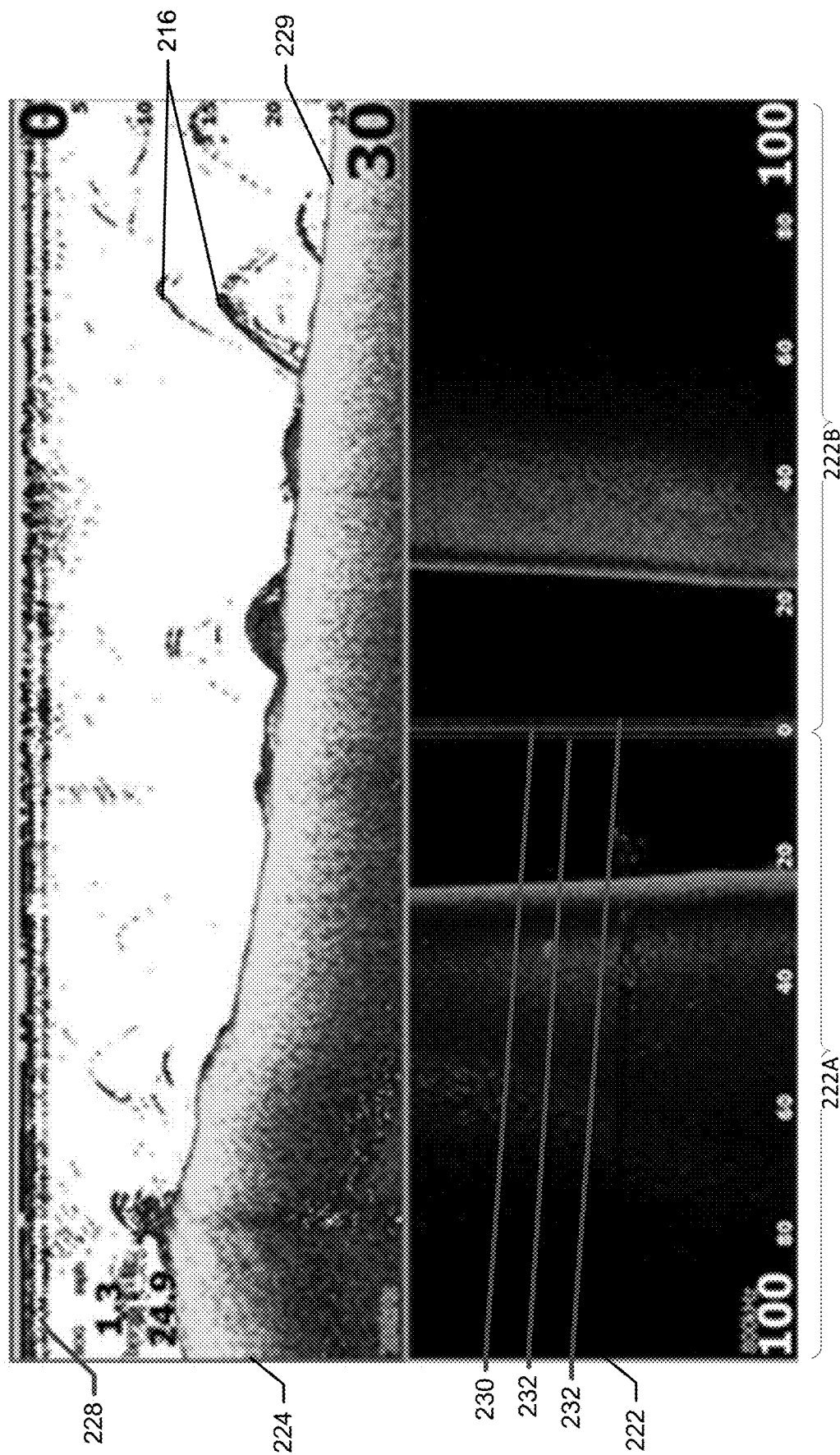
Figure 3B:
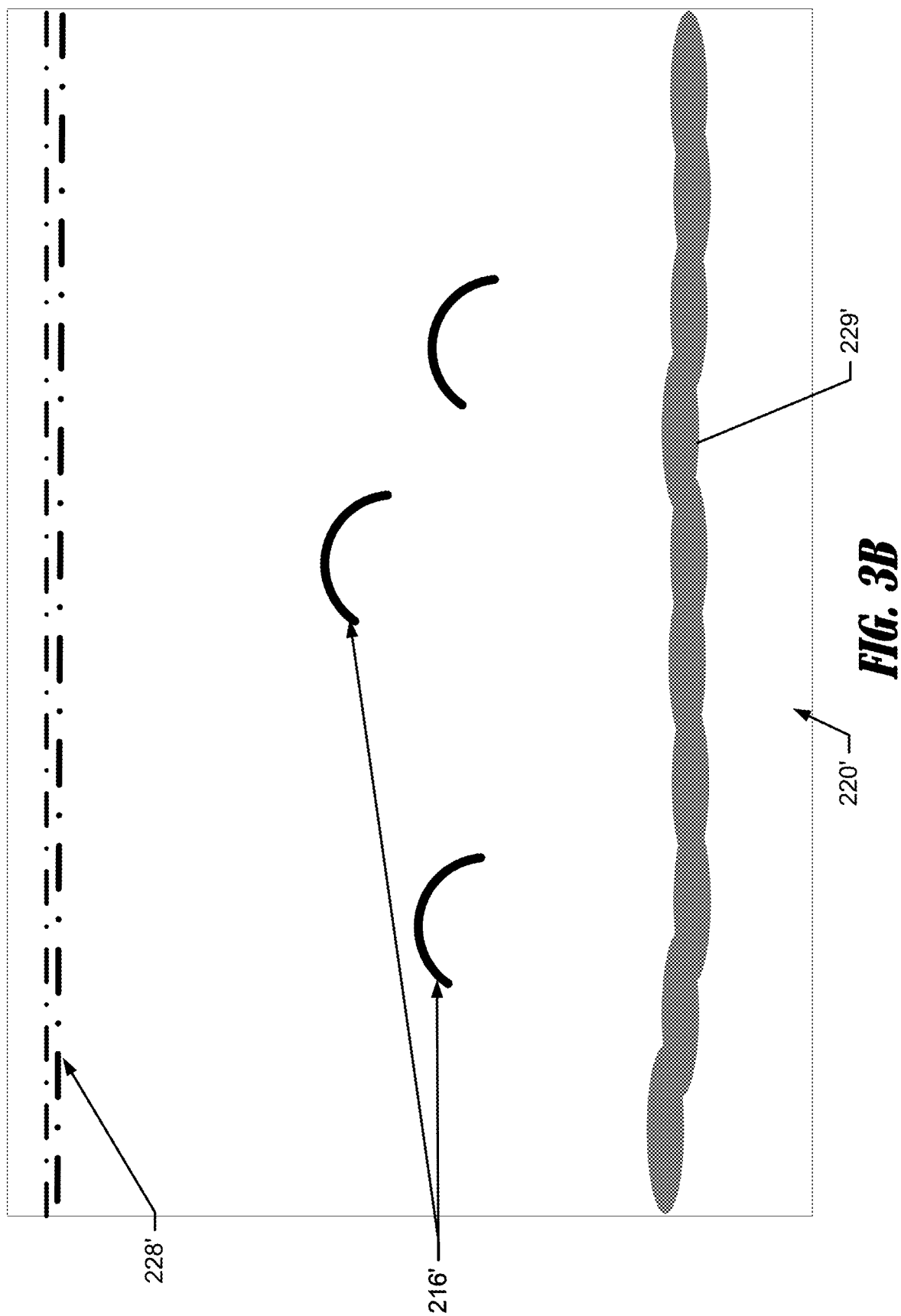
Figure 3C:
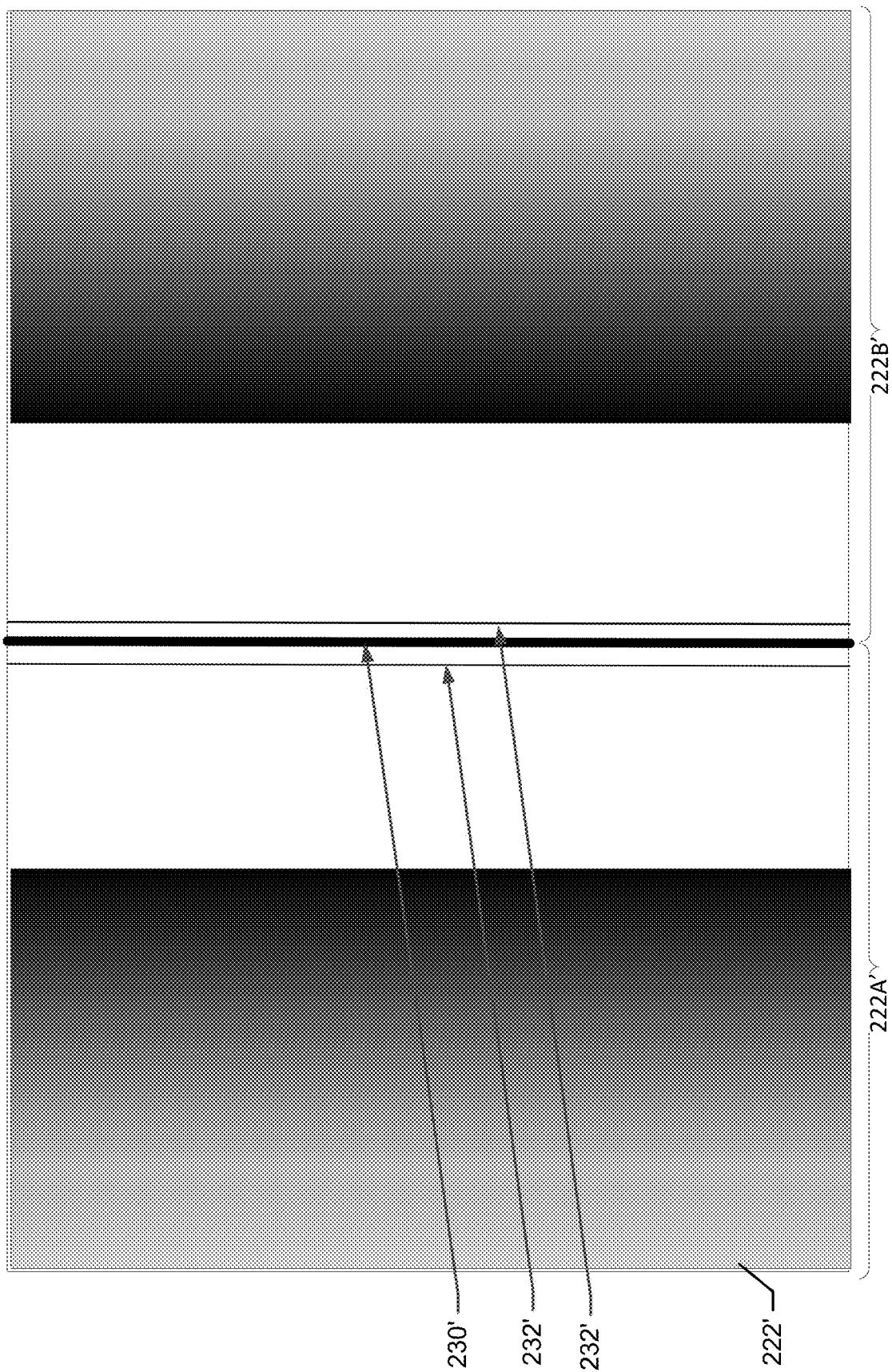
Figure 4:
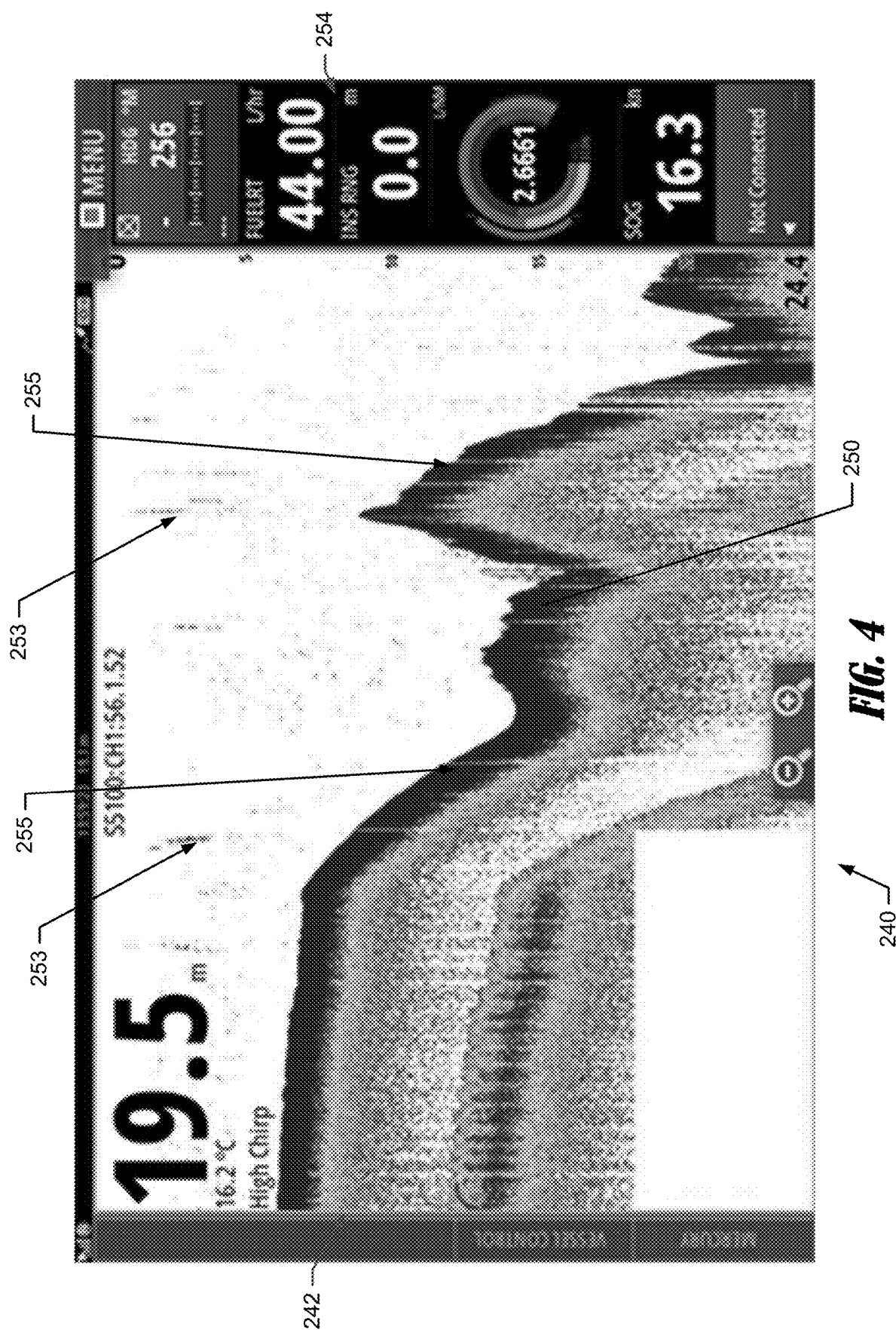
Figure 5:
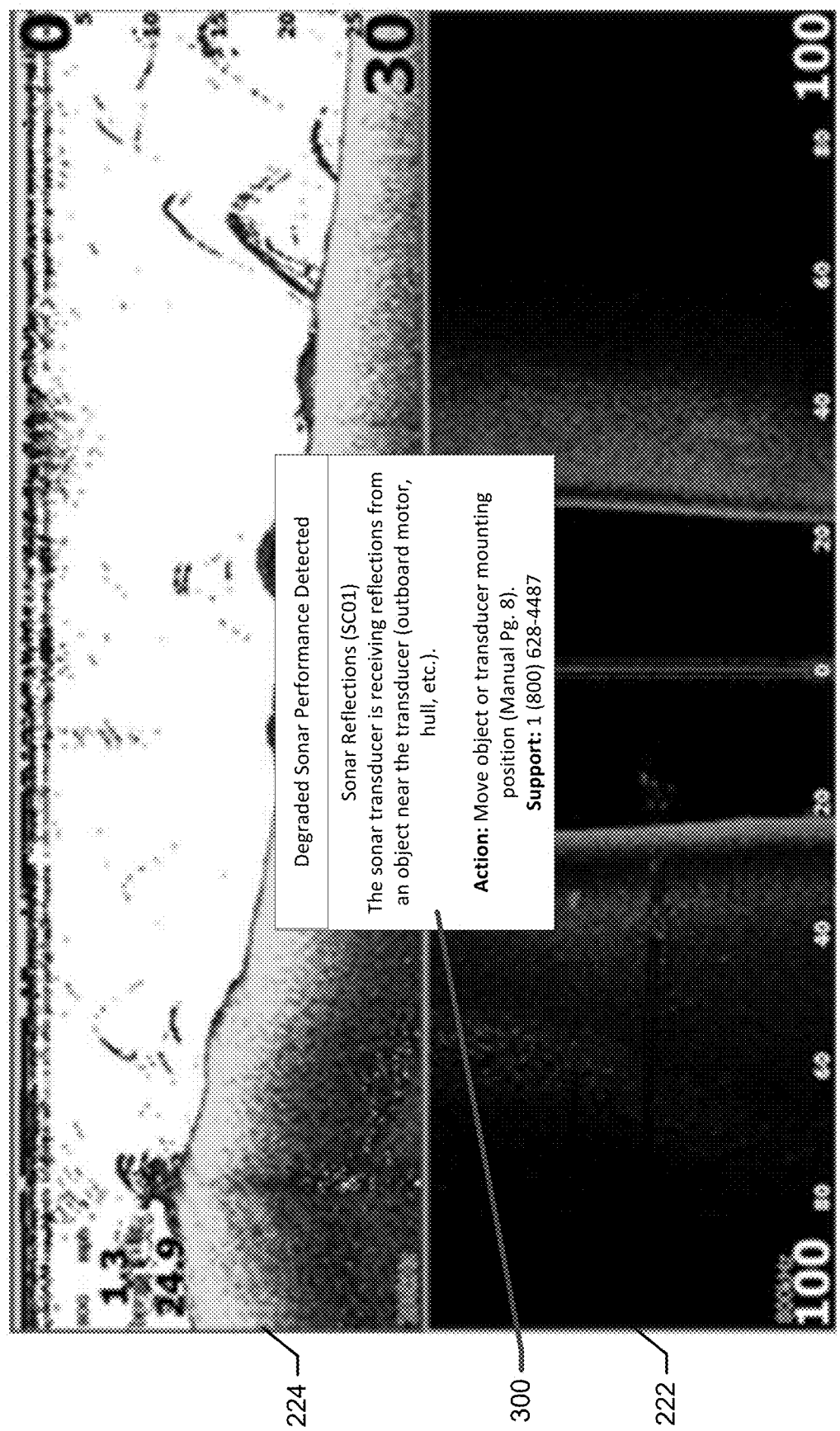
Figure 6:
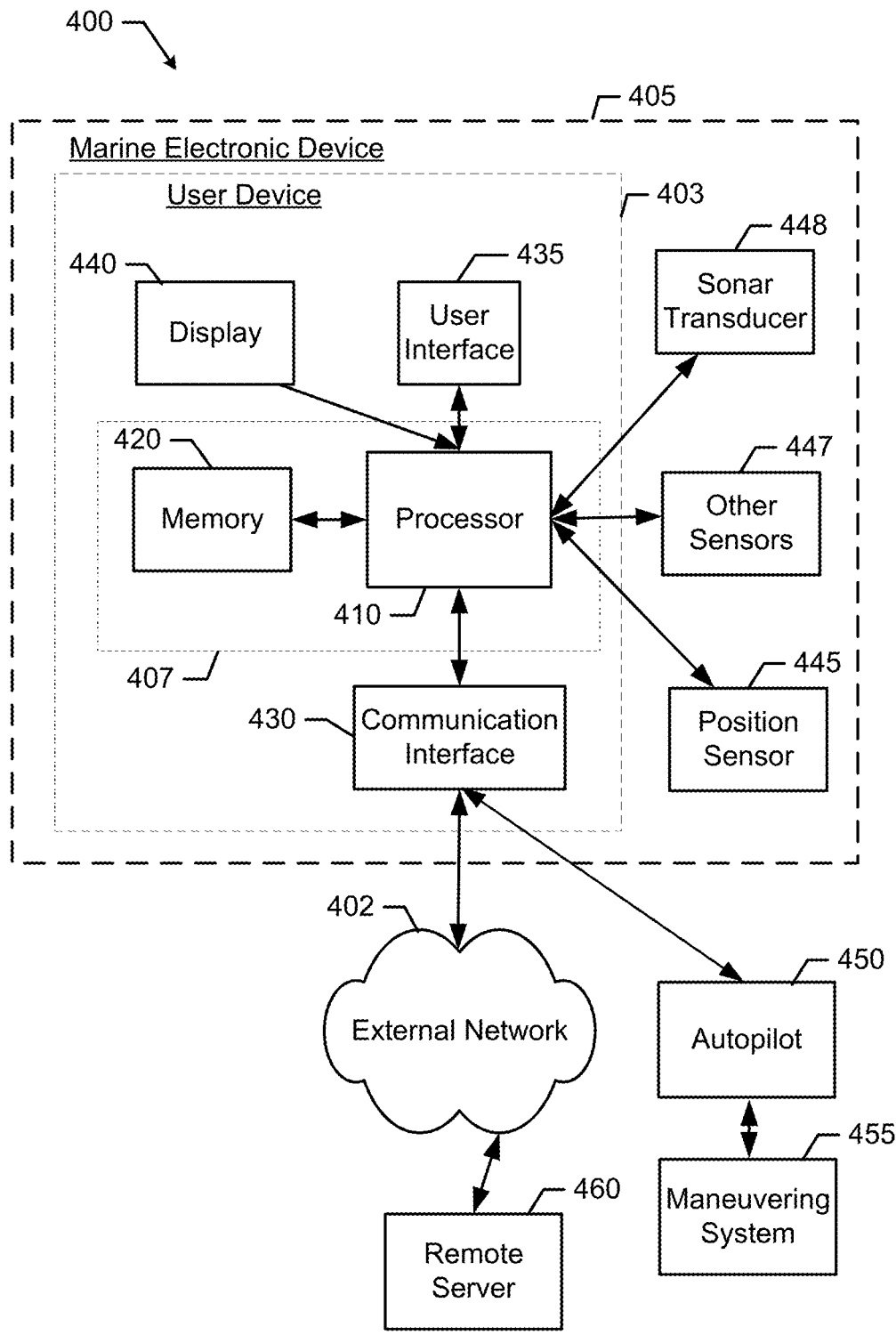
Figure 7:
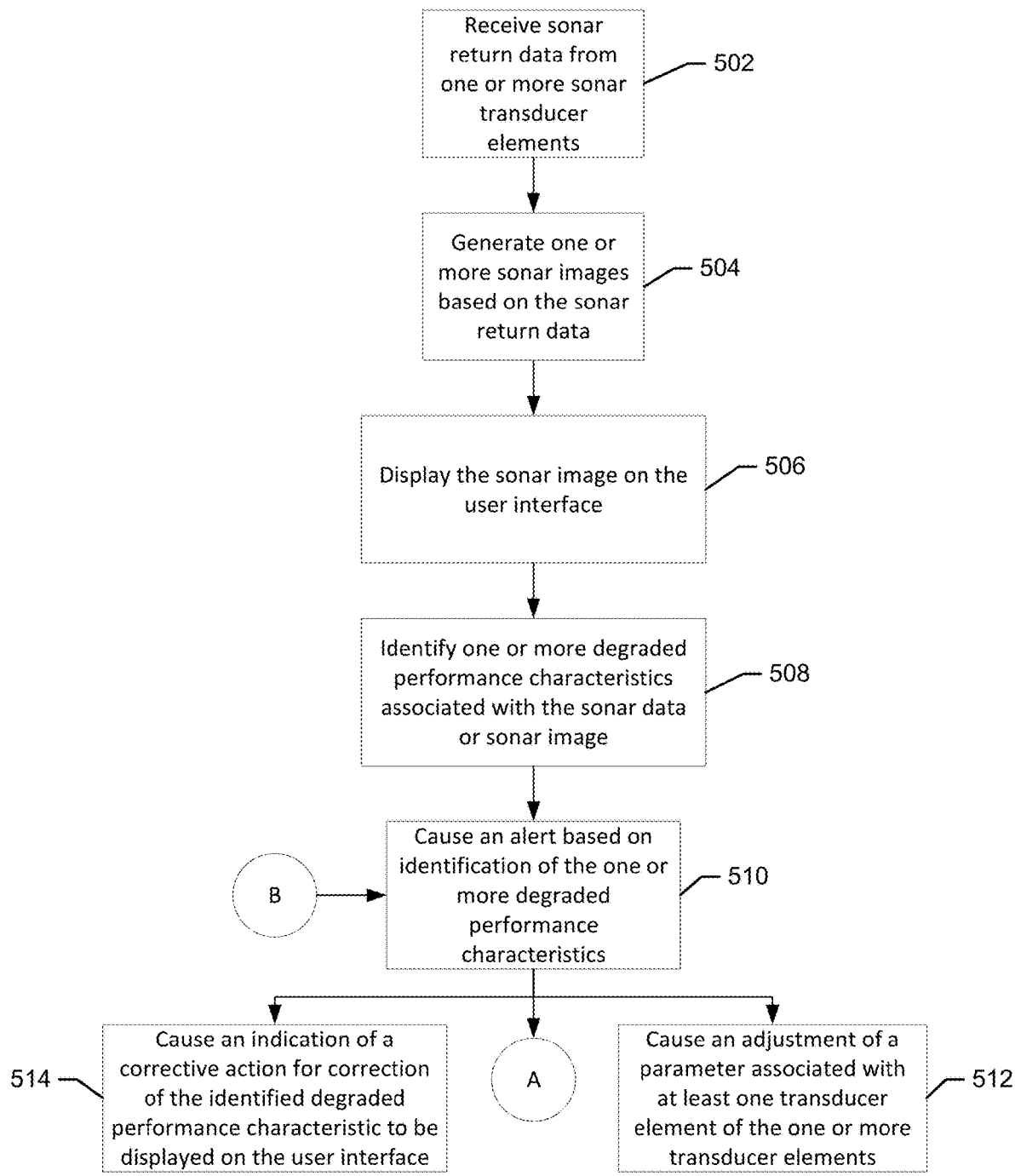
Figure 8:
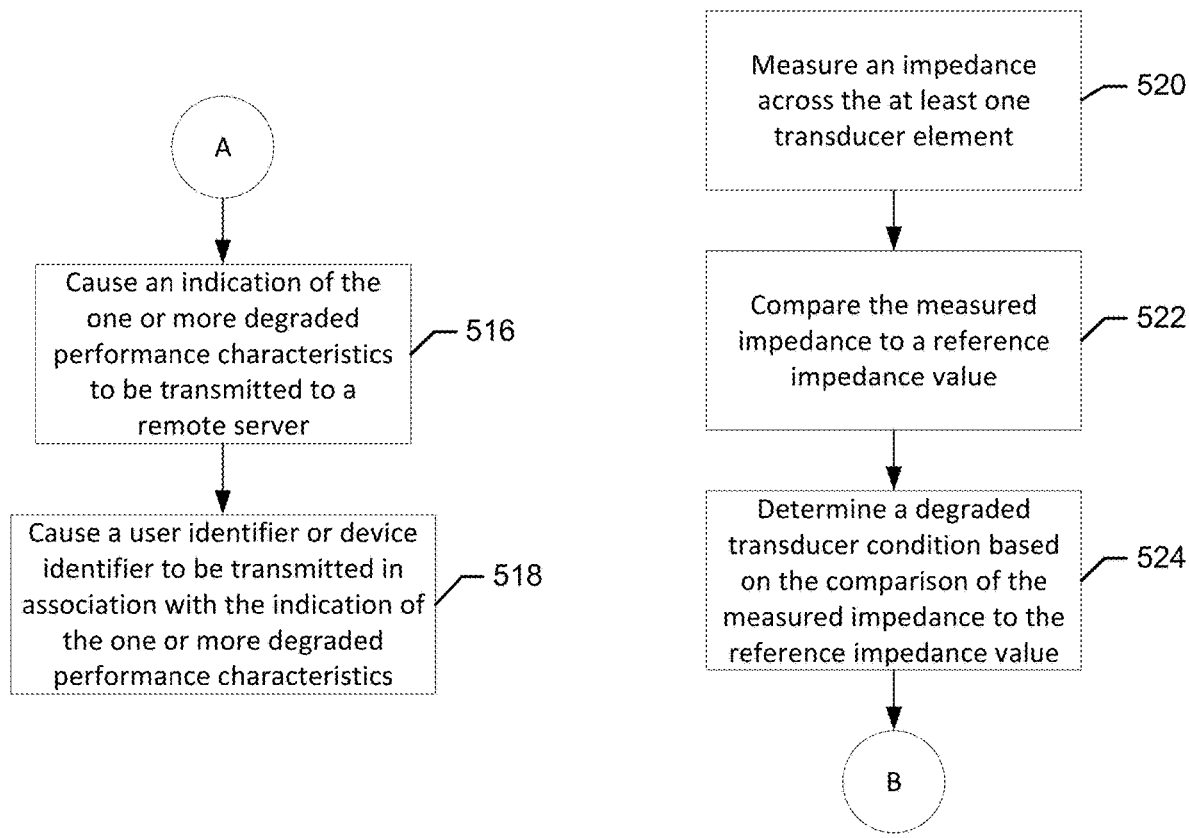

Having thus described the invention in general terms, reference will now be made to the accompanying drawings, which are not necessarily drawn to scale, and wherein:

FIG. 1 illustrates an example vessel including various sonar transducer assemblies in accordance with some embodiments discussed herein;

FIGS. 2A and 2B illustrate example sonar images including interference from a proximate sonar source in accordance with some embodiments discussed herein;

FIGS. 3A-3C illustrate example sonar images including reflections from a vessel in accordance with some embodiments discussed herein;

FIG. 4 illustrates an example sonar image in which a transducer assembly is coming out of the water in accordance with some embodiments discussed herein;

FIG. 5 shows an example indication that may be provided to a user in response to detecting degraded sonar performance in accordance with some embodiments discussed herein;

FIG. 6 illustrates a block diagram of an example marine electronic device and system in accordance with some example embodiments discussed herein; and FIGS. 7 and 8 illustrate flowcharts of example methods of identifying a degraded performance characteristic of a sonar transducer according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies may each include one or more transducer elements configured to transmit sound waves into a body of water, receive sonar return signals from the body of water, and convert the sonar return signals into sonar return data.

FIG. 6 In an example embodiment, a vessel 100 may include a main propulsion motor 105, such as an outboard or inboard motor. Additionally, the vessel 100 may include trolling motor 108 configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

As discussed herein, the transducer assembly (e.g., 102a, 102b, and/or 102c) may receive sonar return signals and transmit sonar return data to a marine electronic device to generate and render one or more sonar images on a display for a user to utilize. In some cases, however, the sonar image generated based on the sonar return data from the transducer assembly may be degraded, such as due to interference, improper installation, damage, or the like. The marine electronic device 405 (discussed below in reference to FIG. 6) may be configured to identify one or more performance characteristics associated with the transducer assembly based on the sonar return data, the sonar images, diagnostic measurements of the transducer assembly, or the like. In response to identifying a degraded performance characteristic, the marine electronic device 405 may cause an alert to notify the user of the degraded performance of the transducer assembly. In some embodiments, in addition to notifying the user of the degraded performance of the transducer assembly, the marine electronic device 405 may automatically adjust an operating characteristic of the transducer assembly, such as an operating frequency, and/or display one or more corrective steps to the user. In an example embodiment, the marine electronic device 405 may transmit an indication of the degraded performance characteristic, such as an error code and a user or device identifier to a remote server, e.g. a support server associated with a support service. The support services may utilize the indication of the degraded performance characteristic to diagnose and provide directions to a user to correct the degraded performance characteristic. This process is discussed in further detail below in reference to FIGS. 7 and 8.

FIGS. 2A-4 illustrate some example degraded performance characteristics as they may be rendered in a sonar image. FIG. 2A illustrates an example sonar display 200 including three sonar images. In the depicted embodiment, the sonar display 200 includes a sidescan sonar image 202, a two dimensional (2D) down sonar image from a circular transducer 204, and a two dimensional (2D) down sonar image from a linear downscan transducer 206. The depicted 2D down sonar image 204 includes a bottom, e.g. sea floor 210, interference 212, and one or more objects 214. The objects 214 may be fish, submerged structures, logs, wreckage, or the like. The interference 212 may make the objects 214 less distinct in the 2D down sonar image 204 and, thus, make it harder for the user to identify the objects 214.

FIG. 2B illustrates a schematic 2D down sonar image 204', similar to the 2D down sonar image 204, to facilitate discussion regarding sonar image interference. The interference 212' may, in some cases, render as a plurality of substantially vertical lines throughout the 2D down sonar image 204'. The interference 212' may partially or completely obscure one or more objects 214' and/or the sea floor 210'. The interference may be caused by a nearby second transducer assembly mounted to the same or a different vessel 100 that is operating at the same (or similar) operating frequency as the transducer assembly producing the 2D down sonar image 204'. In some cases, the second transducer assembly may be operating in proximity to the transducer assembly, such as 5 ft., 10 ft., 25 ft., 50 ft., or the like. The sonar return data may be generated based on not only the sonar return signals of the first transducer assembly, but also the sonar return signals from the second transducer assembly and/or emitted sound waves from the second transducer assembly. In some embodiments, the signals and/or emitted sound waves from the second transducer assembly may render as the interference 212' in the 2D down sonar image 204'.

FIG. 3A illustrates another sonar display 220 including a sidescan sonar image 222 and a 2D down sonar image 224. The reflections may render as one or more horizontal lines near the surface of the 2D down sonar image 224. The 2D down sonar image 224 includes one or more objects 216, reflections 228, and a sea floor 229. Similar, to the interference 212 discussed above, the reflections may make objects 216, such as near the surface, less distinct in the 2D down sonar image 224, and, thus, make it harder for the user to identify the objects 216. In the depicted embodiment, the objects 216 are fish, which are rendered as a "fish arch".

The sidescan sonar image 222 may be rendered as a consolidated image of a port sidescan sonar image 222A and starboard sidescan sonar image 222B. As such, a center line 230 (which corresponds to close proximity to the watercraft) may be rendered at or near the center of the sidescan sonar image 222. In the depicted sonar display 220, reflections 232 render as one or more vertical lines near the center line 230 in both of the port sidescan sonar image 222A and the starboard sidescan sonar image 222B.

FIG. 3B is a simplified schematic 2D down sonar image 224', similar to the 2D down sonar image 224, to facilitate discussion of the reflections noted above. The reflection 228' may render as one or more substantially horizontal lines near the surface of the 2D down sonar image 224'. In some cases the reflection 228' may propagate across the entirety of the 2D down sonar image 224'. The reflection 228' may, in some cases, be caused by mounting of the transducer assembly in close proximity to an outboard motor, a portion of the vessel 100, or other object. A portion of the sound waves emitted by the transducer assembly may be reflected off of the outboard motor, vessel 100, or other object and back to the transducer assembly. Although the depicted sonar image is a 2D down sonar image 204', similar reflections 228' may be rendered in other sonar images (e.g., a 3D sonar image).

FIG. 3C is a simplified sidescan sonar image 222' similar to the sidescan sonar image 222, to facilitate discussion of the reflections. The reflections 232' may render as one or more vertical lines at or near the center line 230'. In some instances, the vertical lines of reflection 232' may propagate from across the entirety of the sidescan sonar image 222'.

FIG. 4 illustrates yet a further sonar display 240 including a 2D down sonar image 242 and a vessel control pane 254. The vessel control pane 254 may include one or more readouts from various sensors indicative of various aspects of the vessel 100, such as speed over ground (SOG), fuel consumption, heading (HDG), or the like.

The 2D down sonar image 242 may include a sea floor 250. In the depicted 2D down sonar image 242, the sea floor 250 may include one or more divergents 255, e.g. the sea floor 250 may be include a rapid increase or decrease in depth. In some cases, rendering of the sea floor 250 may "break up" or be missing. The divergents 255 and/or break up of the sea floor 250 may be caused by the transducer assembly coming out of the body of water 101 or an air bubble trail flowing across the transducer assembly, such as when the vessel 100 moves or comes up to speed in the body of water 101.

In some cases, the transducer assembly may come out of the water due to improper mounting of the transducer assembly to the vessel 100, e.g. mounting too high on the hull 104 or transom 106. Air bubble trails may be caused by an object, or portion of the vessel 100 being positioned in front of the transducer assembly. For example, the object moving through the body of water 101 may generate cavitation bubbles that pass over the transducer assembly.

In some cases, in addition to or in the alternative to the divergents 255, the 2D down sonar image 242 may also include noise 253 caused by the transducer assembly coming out of the body of water 101 or an air bubble trail flowing across the transducer assembly. The noise 253 may render as dots and lines throughout the sonar image 242. In response to the vessel speed increasing, the noise 253 may increase in the 2D down sonar image 242 as new sections (or sonar slices) are rendered.

The degraded performance characteristics depicted and described above in reference to FIGS. 2A-4 are merely for illustrative purposes. One of ordinary skill in the art would immediately appreciate that other degraded performance characteristics may be identified based on the sonar return data and/or the sonar images. Further, although described in reference to the depicted sonar images, the interference, reflections, noise, and/or sea floor divergents may be rendered and/or identified in other sonar images, e.g. sidescan, 2D, 3D, or the like, or from the sonar return data itself.

In an example embodiment, the marine electronic device may receive sonar data from a transducer assembly and generate one or more sonar images based on the sonar data, including but not limited to 2D down sonar images, sidescan sonar images, or the like. In some embodiments, the marine electronic device may be configured to identify one or more degraded performance characteristics associated with the sonar data or sonar images. For example, the marine electronic device may analyze the sonar return data and/or identify one or more degraded performance elements in sonar images to determine degraded performance characteristics. In an example embodiment, the analysis may be based on a predetermined sonar transducer profile stored in a memory associated with the marine electronic device. The sonar transducer profile may be generated based on testing of an example sonar transducer or may be generated for each transducer assembly, such as during a trial subsequent to installation of the transducer assembly. The sonar transducer profile may include normal operating sonar characteristics and/or acceptable sonar image features during one or more predetermined conditions, such as speeds, depths, turning, or the like. Such data could be used, in some embodiments, for comparison purposes to determine if a degraded performance characteristic exists.

In another example embodiment, the marine electronic device may apply machine learning to aid in identification of one or more degraded performance characteristics within the sonar return data and/or sonar images. In some embodiments, the machine learning may be used to generate and/or update the sonar transducer profile. For example, supervised learning or semi-supervised learning may be used to identify one or more degraded performance characteristics and normal characteristics in the sonar return data. The machine learning may include one or more of regression learning, classification learning, clustering, or the like.

In some embodiments, identifying degraded performance characteristics in sonar data may include comparing the received sonar return data to one or more interference thresholds. The interference thresholds may be sonar return values that may be indicative of noise or interference in the sonar return data. For example, the interference thresholds may include a short duration interference threshold which may be higher than a normal value range, as determined by the sonar transducer profile. The interference thresholds may also include a long duration interference threshold that is longer in time period than the short duration interference threshold, such as greater than 5 seconds, 30 seconds, 1 minute, or the like. In some embodiments, there may be additional or different thresholds.

In some embodiments, depending on the configuration, in some cases, the long duration interference threshold and the short duration interference threshold may include a factor based on the degree of interference. For example, the short duration interference threshold may only be exceeded if the interference is above a threshold interference (e.g., it is significantly greater than the normal value), whereas the long duration interference threshold may be exceeded with a lower threshold interference than that of the short duration interference threshold—creating a time period and interference level determination that can be used to determine one or more degraded performance characteristics.

In some example embodiments in which the sonar return data exceeds the short duration or long duration interference thresholds, the marine electronic device may determine a degraded performance characteristic. In some embodiments, the duration or intensity of the interference (e.g., magnitude of the sonar return data values) may be indicative of a specific type of interference with the sonar transducer, such as interference from a second sonar source, reflections from the vessel 100, or the like. The marine electronic device may determine a specific type of interference based on the sonar transducer profile, threshold values, duration or the like, which may then, in some embodiments, be provided in an alert (e.g., an alert to the user, as described below and depicted in FIG. 5).

In some example embodiments, the marine electronic device may analyze one or more of the generated sonar images to identify one or more degraded performance elements. For example, the marine electronic device may compare the sonar images to the sonar transducer profile to determine one or more abnormalities or undesirable features in the sonar images. Additionally or alternatively, the marine electronic device may apply object recognition to the sonar images to identify one or more degraded performance elements, such as they render in the sonar images. In one such example, the object recognition may identify, the interference 212 discussed above in reference to FIGS. 2A and 2B, the reflections 228 discussed in reference to FIGS. 3A-3C, the interference 253 and/or divergents 255 discussed in reference to FIG. 4, or any other degraded performance element.

Object recognition may include, without limitation applying an image processing method, such as stitching and registration, morphologic filtering, thresholding, pixel counting, segmentation, edge detection, color analysis, blob detection, pattern recognition, or the like, to identify one or more degraded performance elements in the one or more sonar images. In some embodiments, the object recognition may be based on machine learning, similar to the analysis of the sonar return data. The machine learning may be supervised learning or semi-supervised learning. In semi-supervised learning a technician may identify one or more degraded performance characteristics in training sonar images or identify sonar images containing degraded performance characteristics from plurality of training sonar images. In some cases, the sonar transducer profile associated with the installed transducer may be utilized in the machine learning, which may render better results than a general profile or sonar images from a similar sonar transducer.

In some example embodiments, the marine electronic device may measure an impedance across one or more transducer elements of the transducer assembly at a predetermined interval, such as upon being powered on, once each 5 min, 30 min, 1 hour, or the like. The impedance measurement may include signal balancing across an amplifier circuit using a known alternating current signal and a variable circuit, or any other suitable method known in the electrical arts. The impedance measurement may identify sudden changes in the impedance across the transducer assembly and/or slow degradation of the transducer assembly over time, such as due to aging.

The marine electronic device may compare the measured impedance to a reference impedance value, which may be stored in memory, such as in a transducer lookup table including one or more transducer models and corresponding reference impedance values. The marine electronic device may compare the measured impedance value to the reference impedance value associated with the transducer assembly, as identified in the transducer lookup table.

Based on the comparison of the measured impedance to the reference impedance value, the marine electronic device may determine a degraded transducer condition (e.g., a degraded performance characteristic). For example, the marine electronic device may determine if the difference between the measured impedance value and the reference impedance value exceeds a predetermined divergence threshold, such as 5 ohms, 10 ohms, or the like, which may be indicative of damage to the transducer assembly. For example, a reduction in the impedance may be indicative of a crack in a transducer housing allowing moisture to enter the transducer assembly, or a short across one or more transducer elements. An increase in impedance may be indicative of delamination in the transducer assembly, or an opening in one or more transducer elements.

In response to identifying one or more degraded performance characteristics, the marine electronic device may cause an alert based on identification of the one or more degraded performance characteristics. The alert may be any suitable audio or visual indication, such as a light, buzzer, alarm, text indication, or the like. The alert to be sounded or displayed on a user interface to draw the attention of the user to the marine electronic device and inform the user of the degraded performance characteristic. Additionally or alternatively, the alert may be sent to a remote server, such as to a support center (e.g., the alert could be an update to a user profile, a note for a technician, a note for the support center, etc.). In an example embodiment, the alert may identify the degraded performance characteristic and/or provide additional information, such as automatic adjustments performed to correct the deficiency and/or contact information for a support service.

In the example depicted in FIG. 5, an alert 300 is displayed overlaid on the sonar display over the side scan sonar image 222 and 2D sonar image 224 that was originally depicted in FIG. 3A. The example alert 300 indicates that a degraded sonar performance has been detected in a header section and identifies the degraded sonar performance characteristic, i.e. sonar reflections, and an error code, i.e. (SC01). In some cases, the alert may include a description of the cause of the degraded sonar performance characteristic, such as "The sonar transducer is receiving reflections from an object near the transducer (outboard motor, hull, etc.)." The alert may include additional information, such as automatic corrective actions, recommended corrective actions, support service contact information, or the like, as discussed below.

In an example embodiment, the marine electronic device may cause an automatic adjustment of a parameter associated with the transducer assembly. For example, the marine electronic device may identify a degraded performance characteristic corresponding to interference from a second sonar source operating proximate to the transducer assembly at the same operating frequency, such as described above in reference to FIGS. 2A and 2B. In some such example embodiments, the marine electronic device may cause the operating frequency of the transducer assembly to be adjusted to a different operating frequency to reduce or eliminate the interference in the sonar return data and/or generated sonar image. Additionally or alternatively, the marine electronic device may adjust other operating parameters of the transducer assembly, such as a transmission pulse rate or other suitable operating parameter to minimize or eliminate the degraded sonar performance. In example embodiments in which the marine electronic device is associated with two or more transducers assemblies, the marine electronic device may activate or deactivate one or more of the transducers assemblies to minimize or eliminate the degraded sonar performance.

In some example embodiments, the marine electronic device stores a lookup table including one or more degraded performance characteristics and one or more corresponding adjustments to operating parameters of the transducer assembly in memory. In some such embodiments, the marine electronic device may execute the one or more adjustments to the operating parameter(s) of the transducer assembly as prescribed for the identified degraded performance characteristic in the lookup table.

As discussed above, the marine electronic device may be configured to cause an indication of a corrective action for correction of the identified degraded performance characteristic. In some embodiments, the corrective action may be displayed on the user interface. In some example embodiments, the lookup table may also include one or more degraded performance characteristics and one or more corresponding corrective actions to correct the identified degraded performance characteristics. As an example, the marine electronic device may cause one or more corrective actions, prescribed for the identified degraded performance characteristic in the lookup table, to be displayed on the user interface, such as a portion of the alert 300. For example, the corrective actions may include an adjustment of the mounting of the transducer assembly to the vessel 100 to prevent the transducer assembly from leaving the body of water 101 at speed, or checking to determine if an object is mounted in front of the transducer assembly, such as to correct air interference with the transducer assembly, as described in reference to FIG. 4. In another example, the corrective actions may include adjustment of the operating frequency of the transducer assembly, such as to correct interference from a second transducer assembly, as discussed in reference to FIGS. 2A and 2B, or an adjustment of the mounting of the transducer assembly to correct reflections from the vessel 100, as discussed in reference to FIG. 3A-3C. In other examples, the corrective actions may include replacement of the transducer assembly, such as when an impedance measurement indicates that the transducer assembly is damaged, as described below. In some embodiments, the corrective actions may include contacting a support service for further diagnoses and/or repair. In the example depicted in FIG. 5 the corrective action prescribes "Move object or transducer mounting position." The example corrective action also includes a reference to the appropriate portion of the user manual to provide further direction or information, i.e. "Manual pg. 8".

In some example embodiments, an indication of the one or more degraded performance characteristics may be transmitted to a remote server. The indication of the degraded performance characteristics may include the sonar return data, one or more sonar images, and/or an error code associated with the degraded performance characteristic, such as from the lookup table. The indication of the degraded performance characteristic may be accessed by support service to further diagnose regarding the transducer assembly. For example, the indication of the degraded performance characteristic may be accessed by a service technician, who may then initiate contact with the user to correct the deficiency. Alternatively, the service technician may access the indication of the degraded performance characteristic in response to being contacted by the user, such as based on an alert or corrective action directing the user to contact the support service. In the alert 300 depicted in FIG. 5, the alert 300 include a contact phone number for a support service.

In some example embodiments the marine electronic device may transmit a user identifier or device identifier in association with the indication of the one or more degraded performance characteristics to the remote server. The user or device identifier may include a serial number, model number, user number, or the like and may include any suitable number, letter, and/or character. The user or device identifier may be associated with a user profile including, for example, a name, device model, contact information, or the like, and the user or device identifier may assist the service provider in contacting the user and/or providing the service technician with device information for diagnostic purposes.

Example Architecture

FIG. 6 shows a block diagram of computing device, such as computing device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with an autopilot 450 or network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine data system 400.

The marine electronic device 405 may include a processor 410, a memory 420, a user interface 435, a display 440, one or more sensors (e.g. position sensor 445, other sensors 447, etc.), a sonar transducer 448, and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, location data, and/or additional environmental data. For example, the processor 410 may be configured to receive sonar return data and identify one or more degraded performance characteristics therein. Additionally or alternatively, the processor 410 may be configured to identify one or more degraded performance characteristics in one or more sonar images.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit data to the remote server, such as a support service server. In an example embodiment, an indication of one or more degraded performance characteristics may be transmitted to the remote server 460 to enable a support service to identify, e.g. diagnose, the degraded performance characteristics and provide instruction or support to correct the degraded performance characteristics. In some example embodiments, the marine electronic device may transmit a user identifier and/or a device identifier to the remote server in association with the degraded performance characteristics.

The position sensor 445 may be configured to determine the current position and/or location of the marine electronic device 405. For example, the position sensor 445 may comprise a GPS, bottom contour, inertial navigation system, such as machined electromagnetic sensor (MEMS), a ring laser gyroscope, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 6 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405. Similarly, the autopilot 450 is depicted remote from the marine electronic device 405, but may be directly connected to the processor 410 within the marine electronic device.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The sonar transducer 448, such as transducer assemblies 102a, 102b, and 102c, may be housed in a trolling motor housing, attached to the vessel 100 or, in some cases, be castable. The sonar transducer 448 may be configured to gather sonar return signals, e.g. sonar returns, from the underwater environment relative to the vessel 100. Accordingly, the processor 410 may be configured to receive the sonar return data from the sonar transducer 448, process the sonar return data to generate an image including a sonar image based on the gathered sonar return data. In some embodiments, the marine electronic device 405 may be used to determine depth and bottom contours, detect fish, locate wreckage, etc. Sonar beams or pulses, from a sonar transducer 448, can be transmitted into the underwater environment. The sonar signals reflect off objects in the underwater environment (e.g. fish, structure, sea floor bottom, etc.) and return to the transducer assembly, which converts the sonar returns into sonar return data that can be used to produce an image of the underwater environment.

With reference to FIG. 1, one or more sonar beams may be generated by the one or more transducer assemblies 102a, 102b, and 102c when deployed in the body of water 101. In some instances, a plurality of transducer elements may be embodied in a transducer array. One example transducer array may be a forward scanning sonar transducer array. In some instances, the transducer array may include one or more of a right scanning (e.g., sidescan) element, a left scanning (e.g., sidescan) element, a conical sonar element, and/or a bar (e.g., linear) downscan sonar element, which may be housed within a transducer housing. In some example embodiments, the transducer array may be a phased transducer array, e.g. a "phased array." The phased array may include a plurality of transducer elements arranged on a PCB (printed circuit board). The PCB may mechanically support and electrically connect the electronic components, including the transducer elements using conductive tracks (e.g. traces), pads, and other features. The conductive tracks may comprise sets of traces, for example, each transducer elements may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar beams into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes or sonar return signals may strike a transducer element (e.g., a transmit/receive transducer, a separate sonar receiver element, or the like), which converts the echoes back into an electrical signal that are processed by a processor (e.g., processing circuity 407 as discussed in reference to FIG. 6) and sent to a display, which may be mounted in a convenient location on the watercraft. Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings may be used to build a picture on the display of the underwater environment, e.g. a sonar image.

In an example embodiment, the one or more transducers assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a three-dimensional position of the sonar return signals (and, for example, a corresponding object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging," which published as US 2016/0341827; and U.S. patent application Ser. No. 14/683,573, entitled Systems and Associated Methods for Producing a 3D Sonar Image," which published as US 2016/0259053, both of which are assigned to the Assignee of the present application and are hereby incorporated by reference herein in their entireties.

The autopilot 450 may include processing circuitry, such as a processor and a memory, configured to operate the maneuvering system 455. The autopilot 450 may be configured to operate the maneuvering system automatically, e.g. without user interaction, causing the vessel to travel along a route, such as along a predetermined sonar sea trial route. The autopilot 450 may generate instructions based on a vessel position, the sea trail route, or the like to operate the maneuvering system 455.

The maneuvering system 455 may include one or more propulsion motors, or engines, including but not limited to, outboard motors, inboard motors, trolling motors, main engines, emergency propulsion motors, or the like. Additionally, the maneuvering system 455 may include one or more control surfaces, such as rudders, planes, or the like configured to steer the vessel.

Example Flowchart(s) and Operations

Embodiments of the present invention provide methods, apparatus and computer program products for identifying degraded performance characteristics of a transducer assembly. Various examples of the operations performed in accordance with embodiments of the present invention will now be provided with reference to FIGS. 7 and 8.

FIGS. 7 and 8 illustrate flowcharts according to example methods for identifying a degraded performance characteristic of a sonar transducer according to an example embodiment. The operations illustrated in and described with respect to FIGS. 7 and 8 may, for example, be performed by, with the assistance of, and/or under the control of one or more of the processor 410, memory 420, communication interface 430, user interface 435, position sensor 445, other sensor 447, sonar transducer 448, display 440, autopilot 450 and/or maneuvering system 455. The method may include receiving sonar return data from one or more sonar transducer elements at operation 502. The processing circuitry 407 may receive the sonar return data from the sonar transducer 448 through a wired or wireless connection, as discussed above in reference to FIG. 1.

The processing circuitry 407 may generate one or more sonar images based on the sonar return data at operation 504. The sonar images may comprise a series of 2D sonar slices compiled to create a sonar image, as discussed above in reference to FIG. 1.

The processing circuitry 407 may be configured to identify one or more degraded performance characteristics associated with the sonar data or sonar image at operation 508. In an example embodiment, the processing circuitry may analyze the sonar return data and/or identify one or more degraded performance elements in sonar images to determine degraded performance characteristics. The analysis may be based on a predetermined sonar transducer profile stored in the memory 420.

In some example embodiments, the processing circuitry 407 may be configured to generate the sonar transducer profile and store the sonar transducer profile to the memory 420. The processing circuitry 407 may be configured to perform a trial and record sonar data during the sea trial to generate the sonar transducer profile. In an example embodiment, the processing circuitry 407 may cause a series of directions to be displayed on the user interface 435 to instruct the user to record sonar return data during various vessel maneuvers, such as stopped with motor off, stopped motor idle, coasting, straight line forward and reverse at one or more speeds, turning, or the like. The user may operate the maneuvering system 455 to perform the prompted directions. Additionally or alternatively, the processing circuitry 407 may be configured to cause the autopilot 450 to execute the one or more prompted directions by controlling the maneuvering system 455.

In an example embodiment, the processing circuitry 407 may apply machine learning to the sonar return data and/or sonar images to generate the sonar transducer profile. For example, supervised learning or semi-supervised learning may be used to identify one or more degraded performance characteristics and normal characteristics in the sonar return data. The machine learning may include one or more of regression learning, classification learning, clustering, or the like.

In an example embodiment, the processing circuitry 407 may compare the received sonar return data to one or more interference thresholds. In an example in which the sonar return data exceeds the short duration or long duration interference thresholds, the processing circuitry 407 may determine a degraded performance characteristic. In some embodiments, the duration or intensity of the interference, e.g. magnitude of the sonar return data values may be indicative of a specific type of interference with the sonar transducer, such as interference from a second sonar source, reflections from the vessel 100, or the like. The processing circuitry 407 may determine a specific type of interference based on the sonar transducer profile, threshold values, duration or the like, which may then me provided in an alert to the user, as described below.

In some example embodiments, the processing circuitry 407 may be configured to analyze one or more of the generated sonar images to identify one or more degraded performance elements. In an example embodiment, the processing circuitry 407 may compare the sonar images to the sonar transducer profile to determine abnormalities in the sonar images. In some example embodiments, the processing circuitry 407 may be configured to apply object recognition to the sonar images to identify one or more degraded performance elements, as they render in the sonar images. For example, the object recognition may identify, the interference 212 discussed above in reference to FIGS. 2A and 2B, the reflections 228 discussed in reference to FIGS. 3A-3C, the interference 253 and/or divergents 255 discussed in reference to FIG. 4, or any other degraded performance element.

In an example embodiment, the method may also include measuring an impedance across the at least one transducer element at operation 520. The processing circuitry 407 may be configured to compare the measured impedance to a reference impedance value at operation 522. Based on the comparison of the measured impedance to the reference impedance value, the processing circuitry 407 may determine a degraded transducer condition at operation 524. In an example embodiment, the processing circuitry 407 may also identify a degraded performance characteristic, at operation 508, based on the determination of a degraded transducer condition.

In response to identifying one or more degraded performance characteristics, the processing circuitry 407 may cause an alert based on identification of the one or more degraded performance characteristics at operation 510. The alert may be any suitable audio or visual indication, such as a light, buzzer, alarm, text indication, or the like. The processing circuitry 407 may cause the alert to be sounded or displayed via user interface 435.

In an example embodiment, the processing circuitry 407 may be configured to cause an adjustment of a parameter associated with at least one transducer element of the one or more transducer elements at operation 512.

In some example embodiments, the processing circuitry 407 may be configured to cause an indication of a corrective action for correction of the identified degraded performance characteristic to be displayed on the user interface at operation 514.

In some example embodiments, the method may include an indication of the one or more degraded performance characteristics to be transmitted to a remote server 460 at operation 516. The processing circuitry 407 may be configured to cause the communication interface 430 to transmit the indication of the degraded performance characteristic to the remote server 460, such as via the external network 402. The processing circuitry 407 may be further configured to cause the communications interface 430 to transmit the user identifier or device identifier in association with the indication of the one or more degraded performance characteristics to the remote server 460 at operation 518.

FIGS. 7 and 8 illustrate a flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A system comprising:
    at least one transducer element mounted to a watercraft and configured to:
        transmit sound waves into an underwater environment of a body of water,
        receive sonar return signals from the underwater environment of the body of water, and
        convert the sonar return signals into sonar return data;
    a marine electronic device comprising:
        a user interface comprising a display;
        a marine electronic device processor; and
        a memory including computer program code configured to, with the marine electronic device processor, cause the marine electronic device to:
            receive sonar return data from the at least one transducer element, wherein the sonar return data is associated with the underwater environment;
            generate one or more sonar images of the underwater environment based on the sonar return data;
            identify one or more degraded performance characteristics of the at least one transducer element within at least one of (i) the sonar return data associated with the underwater environment that is used to generate the one or more sonar images or (ii) the one or more sonar images of the underwater environment; and
            cause an alert based on identification of the one or more degraded performance characteristics, wherein the alert indicates at least one of the one or more degraded performance characteristics or a corrective action for mitigating occurrence of the one or more degraded performance characteristics.

2. The system of claim 1, wherein the processor and memory are further configured to cause the marine electronic device to:
    cause, in response to identifying the one or more degraded performance characteristics, an adjustment of an operating parameter associated with the at least one transducer element.

3. The system of claim 2, wherein the adjustment of the operating parameter comprises changing an operating frequency of the at least one transducer element.

4. The system of claim 1, wherein identifying the one or more degraded performance characteristics comprises identifying one or more degraded performance elements in the one or more sonar images by applying object recognition to image data associated with the one or more sonar images.

5. The system of claim 1, wherein identifying the one or more degraded performance characteristics comprises analyzing the sonar return data.

6. The system of claim 5, wherein analyzing the sonar return data comprises comparing the sonar return data to one or more interference thresholds.

7. The system of claim 1, wherein the processor and memory are further configured to cause the marine electronic device to:
    measure an impedance across the at least one transducer element;
    compare the measured impedance to a reference impedance value; and
    determine a degraded transducer condition based on the comparison of the measured impedance to the reference impedance value,
    wherein causing the alert is further based on determining the degraded transducer condition.

8. The system of claim 1, wherein the one or more degraded performance characteristics are caused by interference from a proximate sonar source.

9. The system of claim 1, wherein the one or more degraded performance characteristics are caused by a reflection from a component of the watercraft to which the at least one transducer element is mounted.

10. The system of claim 1, wherein the one or more degraded performance characteristics are caused by air covering at least a portion of the at least one transducer element.

11. The system of claim 1, wherein the processor and memory are further configured to cause the marine electronic device to:
    cause an indication of the one or more degraded performance characteristics to be transmitted to a remote server.

12. The system of claim 11, wherein the processor and memory are further configured to cause the marine electronic device to:
    cause a user identifier to be transmitted in association with the indication of the one or more degraded performance characteristics.

13. A marine electronic device for a watercraft comprising:
    a user interface comprising a display;
    a marine electronic device processor; and a memory including computer program code configured to, with the marine electronic device processor, cause the marine electronic device to:
  receive sonar return data from at least one transducer element mounted to the watercraft, wherein the at least one transducer element is configured to transmit sound waves into an underwater environment of a body of water, receive the sonar return signals from the underwater environment, and convert the sonar return signals into sonar return data;
  generate one or more sonar images of the underwater environment based on the sonar return data, wherein the sonar return data is associated with the underwater environment;
  identify one or more degraded performance characteristics of the at least one transducer element within at least one of (i) the sonar return data associated with the underwater environment that is used to generate the one or more sonar images or iii) the one or more sonar images of the underwater environment; and
  cause an alert based on identification of the one or more degraded performance characteristics, wherein the alert indicates at least one of the one or more degraded performance characteristics or a corrective action for mitigating occurrence of the one or more degraded performance characteristics.

14. The marine electronic device of claim 13, wherein the processor and memory are further configured to cause the marine electronic device to:
  cause, in response to identifying the one or more degraded performance characteristics, an adjustment of a parameter associated with the at least one transducer element.

15. The marine electronic device of claim 13, wherein identifying the one or more degraded performance characteristics comprises identifying one or more degraded performance elements in the one or more sonar images by applying object recognition to image data associated with the one or more sonar images.

16. The marine electronic device of claim 13, wherein identifying the one or more degraded performance characteristics comprises analyzing the sonar data.

17. The marine electronic device of claim 13, wherein the processor and memory are further configured to cause the marine electronic device to:
  measure an impedance across the at least one transducer element;
  compare the measured impedance to a reference impedance value; and
  determine a degraded transducer condition based on the comparison of the measured impedance to a reference impedance value,
  wherein causing the alert is further based on determining a degraded transducer condition.

18. A method for identifying degraded performance of a transducer system for a watercraft, wherein the method comprises:
  receiving sonar return data from at least one transducer element mounted to the watercraft, wherein the at least one transducer element is configured to transmit sound waves into an underwater environment of a body of water, receive the sonar return signals from the underwater environment, and convert the sonar return signals into sonar return data;
  generating one or more sonar images of the underwater environment based on the sonar return data, wherein the sonar return data is associated with the underwater environment;
  identifying one or more degraded performance characteristics of the at least one transducer element within at least one of (i) the sonar return data associated with the underwater environment that is used to generate the one or more sonar images or iii) the one or more sonar images of the underwater environment; and
  causing an alert based on identification of the one or more degraded performance characteristics, wherein the alert indicates at least one of the one or more degraded performance characteristics or a corrective action for mitigating occurrence of the one or more degraded performance characteristics.

\* \* \* \* \*